(12) United States Patent
Sugawara

(10) Patent No.: US 10,563,049 B2
(45) Date of Patent: *Feb. 18, 2020

(54) NITRILE RUBBER COMPOSITION, CROSS-LINKABLE NITRILE RUBBER COMPOSITION, AND CROSS-LINKED RUBBER

(71) Applicant: ZEON CORPORATION, Tokyo (JP)

(72) Inventor: Shinsuke Sugawara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 15/756,020

(22) PCT Filed: Sep. 13, 2016

(86) PCT No.: PCT/JP2016/076927
§ 371 (c)(1),
(2) Date: Feb. 27, 2018

(87) PCT Pub. No.: WO2017/047571
PCT Pub. Date: Mar. 23, 2017

(65) Prior Publication Data
US 2018/0251628 A1    Sep. 6, 2018

(30) Foreign Application Priority Data

Sep. 17, 2015  (JP) ................. 2015-183806
Nov. 10, 2015  (JP) ................. 2015-220450

(51) Int. Cl.
| | |
|---|---|
| C08L 13/00 | (2006.01) |
| C08L 9/02 | (2006.01) |
| C08C 19/02 | (2006.01) |
| C08K 5/10 | (2006.01) |
| C08F 236/12 | (2006.01) |
| C08K 5/11 | (2006.01) |
| F16J 15/10 | (2006.01) |
| C08K 5/17 | (2006.01) |
| C08F 236/06 | (2006.01) |

(52) U.S. Cl.
CPC ............ *C08L 9/02* (2013.01); *C08C 19/02* (2013.01); *C08F 236/12* (2013.01); *C08K 5/10* (2013.01); *C08K 5/11* (2013.01); *C08K 5/17* (2013.01); *C08L 13/00* (2013.01); *F16J 15/10* (2013.01); *C08F 236/06* (2013.01); *C08L 2312/00* (2013.01)

(58) Field of Classification Search
CPC . C08K 5/17; C08K 5/10; C08K 5/205; C08K 5/11; C08K 5/09; C08K 3/04; C08K 5/18; C08C 19/02; C08F 236/12; C08F 236/02; C08F 220/18; C08F 220/44; C08F 222/16; C08L 9/02; C08L 13/00; C08L 71/08; C08L 2312/00; F16J 15/10
See application file for complete search history.

(56) References Cited

U.S. PATENT DOCUMENTS

| | | | |
|---|---|---|---|
| 6,548,604 B1 | 4/2003 | Kotsuji et al. | |
| 2009/0186977 A1* | 7/2009 | Nagamori et al. ....... | C08K 3/36 524/556 |
| 2016/0297955 A1 | 10/2016 | Inoue et al. | |
| 2017/0166672 A1 | 6/2017 | Inoue et al. | |
| 2017/0240712 A1 | 8/2017 | Sugawara et al. | |
| 2018/0194924 A1 | 7/2018 | Mosaki | |
| 2018/0215906 A1* | 8/2018 | Sugawara et al. .... | C08F 236/14 |

FOREIGN PATENT DOCUMENTS

| | | |
|---|---|---|
| EP | 3 176 190 A1 | 6/2017 |
| EP | 3 208 302 A1 | 8/2017 |
| EP | 3 323 850 A1 | 5/2018 |
| EP | 3 333 201 A1 | 6/2018 |
| JP | 2001-114940 A | 4/2001 |
| JP | 2011-213842 A | 10/2011 |
| JP | 2015-030760 A | 2/2015 |
| WO | 2015/080130 A1 | 6/2015 |

OTHER PUBLICATIONS

Mar. 26, 2019 Extended European Search Report issued in European Patent Application No. 16846442.8.
Mar. 20, 2018 International Preliminary Report on Patentability issued in International Patent Application No. PCT/JP2016/076927.
Dec. 20, 2016 International Search Report issued in International Patent Application No. PCT/JP2016/076927.

* cited by examiner

*Primary Examiner* — Nathan M Nutter
(74) *Attorney, Agent, or Firm* — Oliff PLC

(57) ABSTRACT

A nitrile rubber composition including a filler (B) in a content of 50 to 90 parts by weight and an adipic acid ester-based plasticizer and/or an ether ester-based plasticizer (C) in a content of 0 to 29.9 parts by weight in relation to 100 parts by weight of a nitrile group-containing highly saturated copolymer rubber (A) including an α,β-ethylenically unsaturated nitrile monomer unit in an proportion of 14 wt % or more and less than 21 wt %, and having an iodine value of 120 or less.

8 Claims, No Drawings

NITRILE RUBBER COMPOSITION, CROSS-LINKABLE NITRILE RUBBER COMPOSITION, AND CROSS-LINKED RUBBER

TECHNICAL FIELD

The present invention relates to a nitrile rubber composition capable of giving a cross-linked rubber excellent in cold resistance, compression set resistance, resistance to swelling in oil, and resistance to hardening in oil (particularly, hardening when the cross-linked rubber is immersed in a fuel oil containing a condensed polycyclic aromatic compound), and a cross-linkable nitrile rubber composition and a cross-linked rubber each obtained by using the nitrile rubber composition.

BACKGROUND ART

A nitrile group-containing highly saturated copolymer rubber typified by a hydrogenated acrylonitrile-butadiene copolymer rubber is excellent in heat resistance, oil resistance, ozone resistance and the like as compared with a common nitrile group-containing copolymer rubber such as an acrylonitrile-butadiene copolymer rubber, having a plenty of carbon-carbon unsaturated bonds in the main chain structure thereof. However, on the other hand, a nitrile group-containing highly saturated copolymer rubber is sometimes inferior in cold resistance as compared with a nitrile group-containing copolymer rubber, depending on the nitrile group content or the proportion of the unsaturated bonds in the carbon-carbon bonds of the nitrile group-containing highly saturated copolymer rubber.

As such a nitrile group-containing highly saturated copolymer rubber, for example, Patent Document 1 has proposed a nitrile group-containing highly saturated copolymer rubber (A), comprising an α,β-ethylenically unsaturated nitrile unit (a), an α,β-ethylenically unsaturated carboxylic acid ester unit (b), a conjugated diene unit (c), and a saturated conjugated diene unit (d) each in a particular proportion, having a proportion of the saturated conjugated diene unit (d) of 70 wt % or more in relation to the total proportion of the conjugated diene unit (c) and the saturated conjugated diene unit (d), and having a difference between an extrapolated glass transition initiation temperature (Tig) and an extrapolated glass transition end temperature (Teg) of 10° C. or less. However, in a cross-linked rubber obtained by using the nitrile group-containing highly saturated copolymer rubber described in Patent Document 1, the cold resistance has been improved to some extent, but the resistance to swelling in oil and the resistance to hardening in oil have been insufficient.

RELATED ART DOCUMENTS

Patent Documents

Patent Document 1: Japanese Patent Laid-Open No. 2001-114940

SUMMARY OF INVENTION

Problem to be Solved by the Invention

The present invention was made in view of such a circumstance, and an object of the invention is to provide a nitrile rubber composition capable of giving a cross-linked rubber excellent in cold resistance, compression set resistance, resistance to swelling in oil (small volume change in oil), and resistance to hardening in oil (specifically, small hardness change in an oil containing a condensed polycyclic aromatic compound and small decrease in cold resistance when the cross-linked rubber is immersed in an oil containing a condensed polycyclic aromatic compound).

Means for Solving the Problem

The present inventor engaged in a diligent study to achieve the above object, and consequently have perfected the present invention by discovering that the above object can be achieved with a nitrile rubber composition obtained by mixing at least a filler in a content of 50 to 90 parts by weight in relation to 100 parts by weight of a nitrile group-containing highly saturated copolymer rubber comprising an α,β-ethylenically unsaturated nitrile monomer unit in a proportion of 14 wt % or more and less than 21 wt %, and having an iodine value of 120 or less, the nitrile rubber composition obtained by optionally mixing, in addition to the filler, an adipic acid ester-based plasticizer and/or an ether ester-based plasticizer in an amount of 29.9 parts by weight or less.

In other words, the present invention provides a nitrile rubber composition comprising a filler (B) in a content of 50 to 90 parts by weight and an adipic acid ester-based plasticizer and/or an ether ester-based plasticizer (C) in a content of 0 to 29.9 parts by weight in relation to 100 parts by weight of a nitrile group-containing highly saturated copolymer rubber (A) comprising an α,β-ethylenically unsaturated nitrile monomer unit in a proportion of 14 wt % or more and less than 21 wt %, and having an iodine value of 120 or less.

In the nitrile rubber composition of the present invention, the nitrile group-containing highly saturated copolymer rubber (A) preferably further comprises an α,β-ethylenically unsaturated monocarboxylic acid ester monomer unit and the α,β-ethylenically unsaturated monocarboxylic acid ester monomer unit is more preferably an n-butyl acrylate unit or a methoxyethyl acrylate unit.

In the nitrile rubber composition of the present invention, the nitrile group-containing highly saturated copolymer rubber (A) preferably comprises the α,β-ethylenically unsaturated nitrile monomer unit in a content of 14 wt % or more and less than 21 wt %, a conjugated diene monomer unit in a content of 20 to 70.9 wt %, a carboxyl group-containing monomer unit in a content of 0.1 to 20 wt %, and the α,β-ethylenically unsaturated monocarboxylic ester monomer unit in a content of 10 to 60 wt %.

In the nitrile rubber composition of the present invention, a mixture obtained by mixing two or more types of rubbers each having a different monomer composition and/or a different iodine value is preferably used as the nitrile group-containing highly saturated copolymer rubber (A).

The present invention also provides a cross-linkable nitrile rubber composition obtained by mixing a cross-linking agent with the nitrile rubber composition.

The cross-linking agent is preferably a polyamine-based cross-linking agent.

The present invention further provides a cross-linked rubber obtained by cross-linking the cross-linkable nitrile rubber composition.

The cross-linked rubber of the present invention is preferably one in which a change in hardness and a decrease in cold resistance in an oil containing a condensed polycyclic aromatic compound are reduced.

The present invention also provides an intake manifold gasket obtained by using the cross-linked rubber.

Effects of Invention

The present invention can provide a nitrile rubber composition capable of giving a cross-linked rubber excellent in cold resistance, compression set resistance, resistance to swelling in oil (small volume change in oil), and resistance to hardening in oil (specifically, small hardness change in an oil containing a condensed polycyclic aromatic compound and small decrease in cold resistance when the cross-linked rubber is immersed in an oil containing a condensed polycyclic aromatic compound), and a cross-linked rubber obtained by using such a nitrile rubber composition, the cross-linked rubber excellent in cold resistance, resistance to swelling in oil, and resistance to hardening in oil.

DESCRIPTION OF EMBODIMENTS

Nitrile Rubber Composition

A nitrile rubber composition of the present invention comprises a filler (B) in a content of 50 to 90 parts by weight and an adipic acid ester-based plasticizer and/or an ether ester-based plasticizer (C) in a content of 0 to 29.9 parts by weight in relation to 100 parts by weight of a nitrile group-containing highly saturated copolymer rubber (A) comprising an α,β-ethylenically unsaturated nitrile monomer unit in a proportion of 14 wt % or more and less than 21 wt %, and having an iodine value of 120 or less.

Nitrile Group-Containing Highly Saturated Copolymer Rubber (A) The nitrile group-containing highly saturated copolymer rubber (A) used in the present invention comprises an α,β-ethylenically unsaturated nitrile monomer unit in a proportion of 14 wt % or more and less than 21 wt %, and has an iodine value in a range of 120 or less.

The nitrile group-containing highly saturated copolymer rubber (A) used in the present invention can be obtained, for example, by copolymerizing an α,β-ethylenically unsaturated nitrile monomer and copolymerizable other monomers added if necessary.

The α,β-ethylenically unsaturated nitrile monomer is not particularly limited so long as the α,β-ethylenically unsaturated nitrile monomer is an α,β-ethylenically unsaturated compound having a nitrile group, and for example, acrylonitrile; α-halogenoacrylonitriles such as α-chloroacrylonitrile and α-bromoacrylonitrile; α-alkylacrylonitriles such as methacrylonitrile; etc. may be mentioned. Among these, acrylonitrile and methacrylonitrile are preferable, and acrylonitrile is more preferable. The α,β-ethylenically unsaturated nitrile monomers may be used as single types alone or as a plurality of types combined.

The content of the α,β-ethylenically unsaturated nitrile monomer unit is 14 wt % or more and less than 21 wt %, preferably 15 to 20.5 wt %, and more preferably 16 to 20 wt %, in relation to all the monomer units. When the content of the α,β-ethylenically unsaturated nitrile monomer unit is too small, the obtained cross-linked rubber is liable to be inferior in the oil resistance. Conversely, when the content of the α,β-ethylenically unsaturated nitrile monomer unit is too large, there is a possibility that the resistance to hardening in oil decreases.

Note that in the present invention, when rubbers each having a different monomer composition are combined and used as the nitrile group-containing highly saturated copolymer rubber (A), the content of the α,β-ethylenically unsaturated nitrile monomer unit in the whole mixture of the rubbers each having a different monomer composition may be set within the above-mentioned range. For example, when a rubber (e) having a content of the α,β-ethylenically unsaturated nitrile monomer unit of 15 wt % and a rubber (3) having a content of the α,β-ethylenically unsaturated nitrile monomer unit of 21 wt % are mixed and used as the nitrile group-containing highly saturated copolymer rubber (A) in a ratio of 50:50 (weight ratio), the content of the α,β-ethylenically unsaturated nitrile monomer unit in the whole nitrile group-containing highly saturated copolymer rubber (A) is 18 wt %. Hereinafter, the same shall apply to the conjugated diene monomer unit, the carboxyl group-containing monomer unit, and the like.

The nitrile group-containing highly saturated copolymer rubber (A) used in the present invention preferably also comprises a conjugated diene monomer unit so that the obtained cross-linked rubber has rubber elasticity.

As the conjugated diene monomer forming the conjugated diene monomer unit, conjugated diene monomers having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiene are particularly preferable. The conjugated diene monomers may be used as single types alone or as a plurality of types combined.

The content of the conjugated diene monomer unit (including a hydrogenated fraction) is preferably 20 to 70.9 wt %, more preferably 25 to 65 wt %, and still more preferably 30 to 60 wt %, in relation to all the monomer units. By setting the content of the conjugated diene monomer unit within the above-mentioned range, it is possible to make the obtained cross-linked rubber excellent in the rubber elasticity while keeping heat resistance and chemical stability good.

Further, from the viewpoint of making the obtained cross-linked rubber more excellent in the compression set resistance, the nitrile group-containing highly saturated copolymer rubber (A) used in the present invention preferably also comprises a carboxyl group-containing monomer unit.

The carboxyl group-containing monomer forming the carboxyl group-containing monomer unit is not particularly limited so long as the monomer concerned is a monomer being copolymerizable with the α,β-ethylenically unsaturated nitrile monomer and having one or more unsubstituted (free) carboxyl groups which are not esterified etc. By using a carboxyl group-containing monomer, carboxyl groups can be introduced into the nitrile group-containing highly saturated copolymer rubber (A).

As the carboxyl group-containing monomer, for example, an α,β-ethylenically unsaturated monocarboxylic acid monomer, an α,β-ethylenically unsaturated polyvalent carboxylic acid monomer, an α,β-ethylenically unsaturated dicarboxylic acid monoester monomer, etc. may be mentioned. Further, the carboxyl group-containing monomers also include the monomers in which the carboxyl groups of these monomers form carboxylic acid salts. Moreover, the anhydride(s) of the α,β-ethylenically unsaturated polyvalent carboxylic acid forms a carboxyl group(s) by cleaving the acid anhydride group(s) after copolymerization, and hence can be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, butenedioic acids such as fumaric acid and maleic acid; and itaconic acid, citraconic acid, mesaconic acid, glutaconic acid, allylmalonic acid, teraconic acid, etc. may be mentioned. As the anhydride of the α,β-unsaturated polyvalent carboxylic acid, maleic anhydride, itaconic anhydride, citraconic anhydride, etc. may be mentioned.

As the α,β-ethylenically unsaturated dicarboxylic acid monoester monomer, maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate and monoethyl cyclohexyl itaconate; etc. may be mentioned.

The carboxyl group-containing monomers may be used as single types alone or as a plurality of types combined. Among these, from the viewpoint of making the effects of the present invention further remarkable, the α,β-ethylenically unsaturated dicarboxylic acid monoester monomer is preferable, the α,β-ethylenically unsaturated dicarboxylic acid monoalkyl ester monomer is more preferable, the maleic acid monoalkyl ester is further preferable, and mono-n-butyl maleate is particularly preferable. Note that the above-mentioned alkyl esters preferably have 2 to 8 carbon atoms.

The content of the carboxyl group-containing monomer unit is preferably 0.1 to 20 wt %, more preferably 0.5 to 15 wt %, and still more preferably 1 to 10 wt %, in relation to all the monomer units. By setting the content of the carboxyl group-containing monomer unit within the above-mentioned range, it is possible to make the mechanical properties and the compression set resistance of the obtained cross-linked rubber better.

Further, from the viewpoint of further increasing the cold resistance of the obtained cross-linked rubber, the nitrile group-containing highly saturated copolymer rubber (A) used in the present invention preferably also comprises an α,β-ethylenically unsaturated monocarboxylic acid ester monomer unit.

The α,β-ethylenically unsaturated monocarboxylic acid ester monomer forming the α,β-ethylenically unsaturated monocarboxylic acid ester monomer unit is not particularly limited, but, for example, an α,β-ethylenically unsaturated monocarboxylic acid alkyl ester monomer, an α,β-ethylenically unsaturated monocarboxylic acid alkoxyalkyl ester monomer, an α,β-ethylenically unsaturated monocarboxylic acid aminoalkyl ester monomer, an α,β-ethylenically unsaturated monocarboxylic acid hydroxyalkyl ester monomer, an α,β-ethylenically unsaturated monocarboxylic acid fluoroalkyl ester monomer, etc. may be mentioned.

Among these, the α,β-ethylenically unsaturated monocarboxylic acid alkyl ester monomer or the α,β-ethylenically unsaturated monocarboxylic acid alkoxyalkyl ester monomer is preferable.

The α,β-ethylenically unsaturated monocarboxylic acid alkyl ester monomer preferably has an alkyl group having 3 to 10 carbon atoms, more preferably has an alkyl group having 3 to 8 carbon atoms, and still more preferably has an alkyl group having 4 to 6 carbon atoms, as the alkyl group.

As specific examples of the α,β-ethylenically unsaturated monocarboxylic acid alkyl ester monomer, acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkylcycloalkyl ester monomers such as ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate, methylcyclohexyl crotonate; etc. may be mentioned.

Further, the α,β-ethylenically unsaturated monocarboxylic acid alkoxyalkyl ester monomer preferably has an alkoxyalkyl group having 2 to 8 carbon atoms, more preferably has an alkoxyalkyl group having 2 to 6 carbon atoms, and still more preferably has an alkoxyalkyl group having 2 to 4 carbon atoms, as the alkoxy alkyl group.

As specific examples of the α,β-ethylenically unsaturated monocarboxylic acid alkoxyalkyl ester monomer, acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; etc. may be mentioned.

Among these α,β-ethylenically unsaturated monocarboxylic acid ester monomers, from the viewpoint of being capable of making the effects of the present invention further remarkable, the acrylic acid alkyl ester monomer and the acrylic acid alkoxyalkyl ester monomer are preferable, and n-butyl acrylate and methoxyethyl acrylate are more preferable. Further, these α,β-ethylenically unsaturated monocarboxylic acid ester monomers can also be used as two or more types combined.

In the nitrile group-containing highly saturated copolymer rubber (A) used in the present invention, the content of the α,β-ethylenically unsaturated monocarboxylic acid ester monomer unit is preferably 10 to 60 wt %, more preferably 15 to 55 wt %, and still more preferably 20 to 50 wt %. By setting the content of the α,β-ethylenically unsaturated monocarboxylic acid ester monomer unit within the above-mentioned range, it is possible to more suitably increase the cold resistance of the obtained cross-linked rubber.

Further, the nitrile group-containing highly saturated copolymer rubber (A) used in the present invention may also include, in addition to the α,β-ethylenically unsaturated nitrile monomer unit, the conjugated diene monomer unit, the carboxyl group-containing monomer unit, and the α,β-ethylenically unsaturated monocarboxylic acid ester monomer unit, other monomer units copolymerizable with the monomers forming these. As such other monomers, an α,β-ethylenically unsaturated monocarboxylic acid ester monomer other than those mentioned above, ethylene, an α-olefin monomer, an aromatic vinyl monomer, a fluorine-containing vinyl monomer, a copolymerizable antiaging agent, etc. may be mentioned.

As the α,β-ethylenically unsaturated monocarboxylic acid ester monomer other than those mentioned above, (meth)acrylic acid esters each having a cyanoalkyl group having 2 to 12 carbon atoms such as α-cyanoethyl acrylate, α-cyanoethyl methacrylate, and cyanobutyl methacrylate; (meth)acrylic acid esters each having a hydroxyalkyl group having 1 to 12 carbon atoms such as 2-hydroxyethyl acrylate, 2-hydroxypropyl acrylate, and 2-hydroxyethyl methacrylate; (meth)acrylic acid esters each having a fluoroalkyl group having 1 to 12 carbon atoms such as trifluoroethyl acrylate and tetrafluoropropyl methacrylate; etc. may be mentioned.

The olefin monomer preferably has 3 to 12 carbon atoms, and, for example, propylene, 1-butene, 4-methyl-1-pentene, 1-hexane, 1-octane, etc. may be mentioned.

As the aromatic vinyl monomer, styrene, α-methylstyrene, vinylpyridine, etc. may be mentioned.

As the fluorine-containing vinyl monomer, fluoroethyl vinyl ether, fluoropropyl vinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl) acrylamide, N-(4-anilinophenyl) methacrylamide, N-(4-anilinophenyl) cinnamamide, N-(4-anilinophenyl) crotonamide, N-phenyl-4-(3-vinylbenzyloxy) aniline, N-phenyl-4-(4-vinylbenzyloxy) aniline, etc. may be mentioned.

These copolymerizable other monomers may be used as a plurality of types combined. The content of the other monomer unit(s) is preferably 50 wt % or less, more preferably 40 wt % or less, and still more preferably 10 wt % or less, in relation to all the monomer units constituting the nitrile group-containing highly saturated copolymer rubber (A).

The iodine value of the nitrile group-containing highly saturated copolymer rubber (A) used in the present invention is 120 or less, preferably 80 or less, more preferably 50 or less, and particularly preferably 30 or less. When the iodine value of the nitrile group-containing highly saturated copolymer rubber (A) is too high, the heat resistance and the ozone resistance of the obtained cross-linked rubber are liable to decrease. Note that in the present invention, when rubbers each having a different iodine value are combined and used as the nitrile group-containing highly saturated copolymer rubber (A), the iodine value in the whole mixture of the rubbers each having a different iodine value may be set within the above-mentioned range.

The polymer Mooney viscosity ($ML_{1+4}$, 100° C.) of the nitrile group-containing highly saturated copolymer rubber (A) used in the present invention is preferably 10 to 200, more preferably 15 to 150, still more preferably 15 to 100, and particularly preferably 30 to 70. When the polymer Mooney viscosity of the nitrile group-containing highly saturated copolymer rubber (A) is too low, the mechanical properties of the obtained cross-linked rubber are liable to decrease. Conversely, when the polymer Mooney viscosity of the nitrile group-containing highly saturated copolymer rubber (A) is too high, there is a possibility that the processability of the nitrile rubber composition is decreased.

The method for producing the nitrile group-containing highly saturated copolymer rubber (A) used in the present invention is not particularly limited, but it is possible to produce it by copolymerizing the above-mentioned monomers and, if necessary, hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials usually used can be used.

The emulsifier is not particularly limited, but, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzenesulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, etc. may be mentioned. The amount of addition of the emulsifier is preferably 0.1 to 10 parts by weight and more preferably 0.5 to 5 parts by weight in relation to 100 parts by weight of the monomer used for the polymerization.

The polymerization initiator is not particularly limited so long as the polymerization initiator is a radical initiator. For example, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; etc. may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite or ferrous sulfate as a redox-type polymerization initiator. The amount of addition of the polymerization initiator is preferably 0.01 to 2 parts by weight, in relation to 100 parts by weight of the monomers used for the polymerization.

For the medium of emulsion polymerization, usually water is used. The amount of the water is preferably 80 to 500 parts by weight, and more preferably 80 to 300 parts by weight, in relation to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

Further, in the present invention, for the obtained copolymer, if necessary, the copolymer may be hydrogenated (hydrogenation reaction). The hydrogenation may be performed on the basis of a known method. An oil layer hydrogenation method in which the latex of the copolymer obtained by emulsion polymerization is coagulated, and then the hydrogenation is performed in the oil layer; and an aqueous layer hydrogenation method in which the latex of the obtained copolymer is hydrogenated as it is, etc. may be mentioned.

When the hydrogenation is performed by the oil layer hydrogenation method, preferably the latex of the copolymer prepared by the emulsion polymerization is coagulated by salting out or by using an alcohol, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the nitrile group-containing highly saturated copolymer rubber (A) can be obtained.

For the coagulation of the latex by salting out, a known coagulant such as sodium chloride, calcium chloride, or aluminum sulfate can be used. Further, instead of the coagulation by salting out, the coagulation may also be performed by using an alcohol such as methanol. The solvent for the oil layer hydrogenation method is not particularly limited so long as the solvent is a liquid organic compound dissolving the copolymer obtained by emulsion polymerization; however, as such a solvent, preferably used are benzene, chlorobenzene, toluene, xylene, hexane, cyclohexane, tetrahydrofuran, methyl ethyl ketone, ethyl acetate, cyclohexanone and acetone.

As the catalyst of the oil layer hydrogenation method, any known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be used as two or more types combined; however, in such a case, it is preferable to use a palladium-based catalyst as the main active component. These catalysts are usually used as carried on carriers. As the carrier, silica, silica-alumina, alumina, diatomaceous earth, activated carbon, etc. may be mentioned. The amount of use of the catalyst is preferably 10 to 5000 ppm by weight and more preferably 100 to 3000 ppm by weight in relation to the copolymer.

Alternatively, when the hydrogenation is performed by the aqueous layer hydrogenation method, the hydrogenation reaction is performed by adding water to and diluting, if necessary, the latex of the copolymer prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. As specific examples, among palladium catalysts, as palladium salts of carboxylic acids such as formic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfate.dihydrate, etc. may be mentioned. Among these, the palladium salts of carboxylic acids, dichloro(norbornadiene)palladium, and ammonium hexachloropalladate (IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight in relation to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Further, in the aqueous layer direct hydrogenation method, the thus obtained latex after the hydrogenation reaction is salted out to make it coagulate, separated by filtration, dried, etc. hereby the nitrile group-containing highly saturated copolymer rubber (A) can be obtained. In this case, the steps of filtration and drying following coagulation may be performed by known methods.

Filler (B)

Further, the nitrile rubber composition of the present invention comprises a filler (B) in a content of 50 to 90 parts by weight, preferably 55 to 85 parts by weight, and more preferably 60 to 80 parts by weight, in relation to 100 parts by weight of the above-mentioned nitrile group-containing highly saturated copolymer rubber (A). When the content of the filler (B) is too small or too large, the obtained cross-linked rubber is inferior in the resistance to hardening in oil.

The filler (B) is not particularly limited so long as the filler is any filler usually used in the field of rubber, and any of an organic filler and an inorganic filler can be used, but from the viewpoint of highly effective compounding, the inorganic filler is preferable.

The inorganic filler may be any inorganic filler usually used for compounding in rubber, and, for example, carbon black, silica, clay, alumina, aluminum hydroxide, magnesium oxide, magnesium hydroxide, calcium oxide, calcium hydroxide, magnesium aluminum oxide, titanium oxide, kaolin, pyrophyllite, bentonite, talc, attapulgite, calcium magnesium silicate, aluminum silicate, magnesium silicate, calcium silicate, crystalline aluminosilicate, etc. may be mentioned. Among these, carbon black, silica, and clay are preferably used. The inorganic fillers can be used as single types alone or as a plurality of types combined.

Carbon black may be any carbon black usually used for compounding in rubber, and, for example, furnace black, acetylene black, thermal black, channel black, graphite, etc. may be mentioned.

As silica, natural silica such as quartz powder and silica stone powder; synthetic silica such as silicic anhydride (such as silica gel and aerosil) and hydrous silicic acid; etc. may be mentioned, and among these, synthetic silica is preferable.

Clay is not particularly limited so long as the clay is a natural mineral comprising hydrous aluminum silicate as the main component, but montmorillonite, pyrophyllite, kaolinite, halloysite, sericite, etc. may be mentioned.

Note that the inorganic filler obtained by performing coupling treatment thereon with a silane coupling agent, titanium coupling agent or the like, or performing surface-modifying treatment thereon with a higher fatty acid or a metal salt thereof, a derivative of the higher fatty acid such as an ester or an amide thereof, a surfactant, or the like may be used.

Adipic Acid Ester-Based Plasticizer and/or Ether Ester-Based Plasticizer (C)

The adipic acid ester-based plasticizer and/or the ether ester-based plasticizer (C) use in the present invention is not particularly limited so long as the adipic acid ester-based plasticizer and/or the ether ester-based plasticizer (C) is an adipic acid ester compound or an ether ester-based compound.

As the adipic acid ester-based plasticizer, for example, dibutoxyethyl adipate, di(butoxyethoxyethyl) adipate, di(methoxy tetraethylene glycol) adipate, di(methoxy pentaethylene glycol) adipate, (methoxy tetraethylene glycol) (methoxy pentaethylene glycol) adipate, etc., and, in addition to these, trade name "Adekacizer RS-107," etc. may be mentioned.

As the ether ester-based plasticizer, for example, polyether ester-based plasticizers such as trade name "Adekacizer RS-700" (made by ADEKA Corporation) and trade name "Adekacizer RS-735" (made by ADEKA Corporation), etc. may be mentioned.

In the nitrile rubber composition of the present invention, the content of the adipic acid ester-based plasticizer and/or the ether ester-based plasticizer (C) is 0 to 29.9 parts by weight, preferably 5 to 27.5 parts by weight, and more preferably 10 to 25 parts by weight, in relation to 100 parts by weight of the nitrile group-containing highly saturated copolymer rubber (A). When the content of the adipic acid ester-based plasticizer and/or the ether ester-based plasticizer (C) is too large, the resistance to hardening in oil is inferior. On the other hand, from the viewpoint of further decreasing the hardness and further increasing the cold resistance, the nitrile rubber composition of the present invention is preferably made to contain the adipic acid ester-based plasticizer and/or the ether ester-based plasticizer (C).

Note that as the adipic acid ester-based plasticizer and/or the ether ester-based plasticizer (C), two or more types of compounds may be used together, but in this case, the total amount of the respective compounds used together may fall within the above-mentioned range.

Cross-Linkable Nitrile Rubber Composition

The cross-linkable nitrile rubber composition of the present invention is obtained by mixing a cross-linking agent with the nitrile rubber composition comprising the filler (B) in a content of 50 to 90 parts by weight and the adipic acid ester-based plasticizer and/or an ether ester-based plasticizer (C) in a content of 0 to 29.9 parts by weight in relation to 100 parts by weight of the above-mentioned nitrile group-containing highly saturated copolymer rubber (A).

The cross-linking agent is not particularly limited, but, for example, a sulfur-based cross-linking agent, an organic peroxide cross-linking agent, a polyamine-based cross-linking agent, etc. may be mentioned. Among these, from the viewpoint of further increasing the compression set resistance, the polyamine-based cross-linking agent is preferable.

As the sulfur-based cross-linking agent, sulfur such as a powdery sulfur, flower of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, and polymeric polysulfide; and sulfur-donating compound such as tetramethyl thiuram disulfide, selenium dimethyl dithiocarbamate, and 2-(4'-morpholinodithio)benzothiazole; etc. may be mentioned. These can be used as single types alone or as a plurality of types combined.

As the organic peroxide crosslinking agent, dicumyl peroxide, cumene hydroperoxide, t-butyl cumyl peroxide, para-menthane hydroperoxide, di-t-butyl peroxide, 1,3-bis(t-butylperoxy isopropyl)benzene, 1,4-bis(t-butylperoxy isopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These can be used as single types alone or as a plurality of types combined.

The polyamine-based cross-linking agent is not particularly limited so long as the polyamine-based cross-linking agent is a compound having two or more amino groups or a compound becoming a form having two or more amino groups at the time of cross-linking, but however, the polyamine-based cross-linking agent is preferably a compound comprised of an aliphatic hydrocarbon or an aromatic hydrocarbon in which a plurality of hydrogen atoms are substituted with amino groups or hydrazide structures (structures each represented by —$CONHNH_2$, where CO represents a carbonyl group) and a compound becoming the form of the aforementioned compound at the time of cross-linking.

As specific examples of the polyamine-based cross-linking agent, aliphatic polyvalent amines such as hexamethylenediamine, hexamethylenediamine carbamate, N, N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene) dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; etc. may be mentioned. Among these, from the viewpoint of being capable of making the effects of the present invention more remarkable, aliphatic polyvalent amines and the aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the cross-linking agent in the cross-linkable nitrile rubber composition of the present invention is not particularly limited, but is preferably 0.1 to 20 parts by weight, more preferably 0.2 to 15 parts by weight, and still more preferably 0.5 to 10 parts by weight, in relation to 100 parts by weight of the nitrile group-containing highly saturated copolymer rubber (A). By setting the content of the cross-linking agent within the above-mentioned range, it is possible to make the mechanical properties of the obtained cross-linked rubber better.

Further, when a polyamine-based cross-linking agent is used as the cross-linking agent, the cross-linkable rubber composition preferably further includes a basic cross-linking accelerator from the viewpoint of being capable of make the mechanical properties of the obtained cross-linked rubber better.

As specific examples of the basic cross-linking accelerator, a compound represented by the following general formula (1), a basic cross-linking accelerator having a cyclic amidine structure, a guanidine-based basic cross-linking accelerator, an aldehyde amine-based basic cross-linking accelerator, etc. may be mentioned.

$$R^1\text{—NH—}R^2 \tag{1}$$

(In the general formula (1), $R^1$ and $R^2$ are each independently a substituted or unsubstituted alkyl group having 1 to 12 carbon atoms, or a substituted or unsubstituted cycloalkyl group having 5 to 12 carbon atoms.)

$R^1$ and $R^2$ are each a substituted or unsubstituted alkyl group having 1 to 12 carbon atoms, or a substituted or unsubstituted cycloalkyl group having 5 to 12 carbon atoms, but are each preferably a substituted or unsubstituted cycloalkyl group having 5 to 12 carbon atoms, and particularly preferably a substituted or unsubstituted cycloalkyl group having 5 to 8 carbon atoms.

Further, $R^1$ and $R^2$ each preferably have no substituent.

Note that, as specific examples of the substituent(s) in the case where $R^1$ and $R^2$ each have a substituent(s), a hydroxyl group, an alkoxy group, an alkoxycarbonyl group, an amino group, a halogen atom, etc. may be mentioned.

Further, among the compounds represented by the above general formula (1), from the viewpoint of being capable of more enhancing the processability and scorch stability, a compound represented by the following general formula (2) is more preferable.

$$R^3\text{—NH—}R^4 \tag{2}$$

(In the general formula (2), $R^3$ and $R^4$ are each independently a substituted or unsubstituted cycloalkyl group having 5 to 8 carbon atoms.)

$R^3$ and $R^4$ are each a substituted or unsubstituted cycloalkyl group having 5 to 8 carbon atoms, but are each preferably a substituted or unsubstituted cycloalkyl group having 5 to 6 carbon atoms, and more preferably a substituted or unsubstituted cycloalkyl group having 6 carbon atoms.

Further, $R^3$ and $R^4$ each preferably have no substituent.

Note that as specific examples of the substituent(s) in the case where $R^3$ and $R^4$ each have a substituent(s), a hydroxyl group, an alkoxy group, an alkoxycarbonyl group, an amino group, a halogen atom, etc. may be mentioned.

As specific examples of the compound represented by the general formula (1), dicycloalkylamines such as dicyclopentylamine, dicyclohexylamine, and dicycloheptylamine; secondary amines each having an alkyl group and a cycloalkyl group bonded to the nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines each having a hydroxyl group-containing alkyl group and a cycloalkyl group bonded to the nitrogen atom such as N-hydroxymethylcyclopentylamine and N-hydroxybutylcyclohexylamine; secondary amines each having an alkoxy group-containing alkyl group and a cycloalkyl group bonded to the nitrogen atom such as N-methoxyethylcyclopentylamine and N-ethoxybutylcyclohexylamine; secondary amines each having an alkoxycarbonyl group-containing alkyl group and a cycloalkyl group bonded to the nitrogen atom such as N-methoxycarbonylbutylcyclopentylamine and N-methoxycarbonylheptylcyclohexylamine; secondary amines each having an amino group-containing alkyl group and a cycloalkyl group bonded to the nitrogen atom such as N-aminopropylcyclopentylamine and N-aminoheptylcyclohexylamine; and secondary amines each having a halogen atom-containing cycloalkyl group bonded to the nitrogen atom such as di(2-chlorocyclopentyl)amine and di(3-chlorocyclopentyl)amine; etc. may be mentioned, but from the viewpoint of being capable of more enhancing the processability and the scorch stability, a dicycloalkylamine is preferable, dicyclopentylamine and dicyclohexylamine are more preferable, and dicyclohexylamine is particularly preferable.

As the basic cross-linking accelerator having a cyclic amidine structure, 1,8-diazabicyclo[5.4.0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned. Among these basic cross-linking accelerators each having a cyclic amidine structure, 1,8-diazabicyclo[5.4.0]undecene-7 and 1,5-diazabicyclo[4.3.0]nonene-5 are preferable, and 1,8-diazabicyclo[5.4.0]undecene-7 is more preferable. As the guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butylaldehyde aniline, acetaldehyde ammonia, etc. may be mentioned.

Among these basic cross-linking accelerators, a compound represented by the general formula (1), a guanidine-based basic cross-linking accelerator, and a basic cross-linking accelerator having a cyclic amidine structure are preferable, and a compound represented by the general formula (1) and a basic cross-linking accelerator having a cyclic amidine structure are more preferable.

Note that the compound represented by the general formula (1) may be comprised of alcohols such as an alkylene glycol and an alkyl alcohol having 5 to 20 carbon atoms mixed together, and may further contain an inorganic acid and/or an organic acid. Further, as for the compound represented by the general formula (1), the compound represented by the general formula (1) may form a salt(s) with the inorganic acid and/or the organic acid, and further may form a complex with an alkylene glycol. Further, the basic cross-linking accelerator having the above cyclic amidine structure may form a salt with a carboxylic acid or an alkyl phosphoric acid, etc.

In the case where the basic cross-linking accelerator is mixed, the amount of the basic cross-linking accelerator in the cross-linkable rubber composition of the present invention is preferably 0.1 to 20 parts by weight, more preferably 0.2 to 15 parts by weight, and still more preferably 0.5 to 10 parts by weight, in relation to 100 parts by weight of the nitrile group-containing highly saturated copolymer rubber (A).

Other Compounding Agents

Further, the nitrile rubber composition and the cross-linkable nitrile rubber composition of the present invention may include, in addition to the above components, compounding agents usually used in the field of rubber such as a metal oxide such as zinc oxide or magnesium oxide, an $\alpha,\beta$-ethylenically unsaturated carboxylic acid metal salt such as zinc methacrylate or zinc acrylate, a co-cross-linking agent, a cross-linking aid, a cross-linking retarder, an anti-aging agent, an antioxidant, a light stabilizer, a scorch retarder such as a primary amine, an activating agent such as diethylene glycol, a silane coupling agent, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; etc. may be mentioned. These may be used as single types or a plurality of types combined.

Furthermore, the nitrile rubber composition and the cross-linkable nitrile rubber composition of the present invention may contain rubber other than the nitrile group-containing highly saturated copolymer rubber (A) in a range where the effects of the present invention are not obstructed. As such rubber other than the nitrile group-containing highly saturated copolymer rubber (A), acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, and polyisoprene rubber, etc. may be mentioned. When mixing in rubber other than the nitrile group-containing highly saturated copolymer rubber (A), the amount is preferably 30 parts by weight or less with respect to 100 parts by weight of the nitrile group-containing highly saturated copolymer rubber (A), more preferably 20 parts by weight or less, still more preferably 10 parts by weight or less.

The nitrile rubber composition and the cross-linkable nitrile rubber composition of the present invention are prepared by mixing the above ingredients preferably in a nonaqueous system. The method of preparation of the nitrile rubber composition and the cross-linkable nitrile rubber composition of the present invention are not particularly limited, but usually it can be prepared by kneading the ingredients other than the cross-linking agent and ingredients unstable against heat (co-cross-linking agents etc.) by a mixing machine such as a Banbury mixer, internal mixer, or kneader for primary kneading, then transferring the mixture to open rolls etc. and adding the cross-linking agent and ingredients unstable against heat etc. for secondary kneading.

Cross-Linked Rubber

The cross-linked rubber of the present invention is obtained by cross-linking the above cross-linkable nitrile rubber composition of the present invention.

The cross-linked rubber of the present invention can be produced as follows: the cross-linkable nitrile rubber composition of the present invention is used, the composition is formed by using a forming machine corresponding to the desired shape, such as an extruder, an injection molding machine, a compressor, or a roll, the cross-linking reaction is performed by heating the formed product, and thus the shape of the formed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is obtained by using the above nitrile rubber composition and the cross-linkable nitrile rubber composition of the present invention, and is excellent in cold resistance, compression set resistance, resistance to swelling in oil (small volume change in oil), and resistance to hardening in oil (specifically, small hardness change in an oil containing a condensed polycyclic aromatic compound and small decrease in cold resistance when the cross-linked rubber is immersed in an oil containing a condensed polycyclic aromatic compound).

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventar), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, ironmaking rolls, papermaking rolls, industrial rolls, and office equipment rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit boards or other binders, fuel cell separators and also other broad applications in the electronics field. In particular, since the cross-linked rubber of the present invention is excellent in resistance to swelling in oil and resistance to hardening in oil, it can be suitably used for various types of gaskets for automotive parts, especially intake manifold gaskets.

EXAMPLES

Hereinafter, the present invention will be described more specifically by way of Examples and Comparative Examples, but the present invention is not limited to these Examples. In what follows, unless otherwise specified, "parts" are based on weight. The methods of testing or evaluating the physical properties and the characteristics are as follows.

Rubber Composition

The contents of the respective monomer units constituting a nitrile group-containing highly saturated copolymer rubber were measured by the following method.

Specifically, the content of the mono-n-butyl maleate unit was calculated as follows. To 0.2 g of a 2-mm square piece of the nitrile group-containing highly saturated copolymer rubber, 100 mL of 2-butanone was added. The mixture was stirred for 16 hours, and then 20 mL of ethanol and 10 mL of water were added to the mixture. While stirring, a titration was performed at room temperature by using a 0.02N hydrous ethanol solution of potassium hydroxide, and thymolphthalein as an indicator, and thus the number of moles of the carboxyl group with respect to 100 g of the nitrile group-containing highly saturated copolymer rubber was determined. Then, the determined number of moles was converted into the content of the mono-n-butyl maleate unit.

The content of the 1,3-butadiene unit and the content of the saturated butadiene unit were calculated by measuring the iodine values before and after hydrogenation reaction (in accordance with JIS K 6235) using the nitrile group-containing highly saturated copolymer rubber.

The content of the acrylonitrile unit was calculated by measuring the nitrogen content in the nitrile group-containing highly saturated copolymer rubber by the Kjeldahl method in accordance with JIS K6384.

The content of the n-butyl acrylate unit and the content of the 2-methoxyethyl acrylate unit were determined by calculation from the content of the mono-n-butyl maleate unit, the content of the 1,3-butadiene unit, the content of the saturated butadiene unit, and the content of the acrylonitrile unit each determined as described above.

Iodine Value

The iodine value of the nitrile group-containing highly saturated copolymer rubber was measured in accordance with JIS K6235.

Mooney Viscosity (Polymer Mooney)

The Mooney viscosity (polymer Mooney) of the nitrile group-containing highly saturated copolymer rubber was measured in accordance with JIS K6300 (unit: [$ML_{1+4}$, 100° C.]).

Original State Physical Properties (Tensile Strength, Elongation at Break, and Hardness)

A cross-linkable nitrile rubber composition was placed in a mold of 15 cm in length, 15 cm in width and 0.2 cm in depth, and was press-formed at 170° C. for 20 minutes while being pressurized at a press pressure of 10 MPa, and thus a sheet-shaped cross-linked rubber was obtained. Then, the obtained cross-linked rubber was transferred to a gear oven and subjected to a secondary cross-linking at 170° C. for 4 hours to obtain a sheet-shaped cross-linked rubber, and the obtained sheet-shaped cross-linked rubber was punched with a JIS No. 3 dumbbell to prepare a test piece. Then, by using the obtained test piece, the tensile strength and the elongation at break of the cross-linked rubber were measured in accordance with JIS K6251, and, further, the hardness of the cross-linked rubber was measured by using a durometer hardness tester (type A) in accordance with JIS K6253.

Cold Resistance Test

By using the sheet-shaped cross-linked product obtained in the same manner as in the evaluation of original state physical properties, the cold resistance of the cross-linked rubber was measured in accordance with JIS K6261 by the TR test (low temperature elasticity recovery test). Specifically, an extended test piece was frozen, then the recoverability of the extended test piece was measured by continuously increasing the temperature, and the temperature TR10 at which the length of the test piece was contracted (recovered) by 10% due to the temperature increase was measured. It is possible to evaluate that the lower TR10, the more excellent in the cold resistance of the cross-linked rubber.

O-Ring Compression Set

By using a mold having an inner diameter of 30 mm and a ring diameter of 3 mm, the cross-linkable nitrile rubber composition was subjected to cross-linking at a press pressure of 10 MPa at 170° C. for 20 minutes, and was then subjected to secondary cross-linking at 170° C. for 4 hours to obtain a test piece of an O-ring. The O-ring compression set was measured by using this test piece under the condition of holding the test piece at 150° C. for 168 hours in a state where the test piece was compressed by 25% in accordance with JIS K6262.

Resistance to Swelling in Oil Test

By using the sheet-shaped cross-linked product obtained in the same manner as in the evaluation of original state physical properties, a resistance to swelling in oil test was performed in accordance with JIS K6258 by immersing the obtained sheet-shaped cross-linked rubber in a test fuel oil (Fuel B:ethanol=74:26 (volume ratio) (Fuel B:a mixture of isooctane:toluene=70:30 (volume ratio)) regulated at 60° C. for 70 hours.

In the resistance to swelling in oil test, the volumes of the cross-linked rubber before and after the immersion in the fuel oil were measured, the volume swelling rate $\Delta V$ (unit: %) after the immersion in the fuel oil was calculated according to "$\Delta V$=([volume after immersion in fuel oil−volume before immersion in fuel oil]/volume before immersion in fuel oil)×100," and the resistance to swelling in oil was evaluated on the basis of the calculated volume swelling rate $\Delta V$. The smaller the volume swelling rate $\Delta V$, the more excellent the resistance to swelling in oil.

Hardening Test after Immersion in Condensed Polycyclic Aromatic Compound-Containing Fuel Oil (Hardness Change when Cross-Linked Rubber is Immersed in Fuel Oil Containing Condensed Polycyclic Aromatic Compound)

A sheet-shaped cross-linked rubber was prepared in the same manner as in the resistance to swelling in oil test. In addition to this cross-linked rubber, a phenanthrene-constraining test fuel oil was prepared by dissolving phenanthrene in a content of 10 wt % in a liquid mixture (Fuel C:ethanol=80:20 (volume ratio)) composed of Fuel C (a mixture of isooctane:toluene=50:50 (volume ratio)) and ethanol.

Further, for the sheet-shaped cross-linked rubber obtained as described above, a measurement of the hardness was performed in accordance with JIS K6253 by using an international rubber hardness tester (IRHD M method). Next, in the phenanthrene-containing test fuel oil prepared as described above, the sheet-shaped cross-linked rubber obtained as described above was immersed at 60° C. for 70 hours; then the cross-linked rubber was taken out from the phenanthrene-containing test fuel oil, dried at 120° C. for 3 hours, allowed to stand still at room temperature for 24 hours, and then again subjected to a hardness measurement under the same conditions as described above. Then, the hardness change $\Delta H_S$ was determined according to "hardness change $\Delta H_S$=hardness after immersion in fuel oil−hardness before immersion in fuel oil." It is possible to evaluate that the larger the value of the hardness change $\Delta H_S$, the larger the increase of the hardness due to the immersion in the phenanthrene-containing test fuel oil, and the cross-linked rubber is inferior in the resistance to hardening in oil. The cross-linked rubber having a value of the hardness change within ±10 pts was evaluated as "Good", and the cross-linked rubber having a value of the hardness change exceeding ±10 pts was evaluated as "Poor".

Low Temperature-Property Test after Immersion in Condensed Polycyclic Aromatic Compound-Containing Fuel Oil (Cold Resistance after Cross-Linked Rubber is Immersed in Fuel Oil Containing Condensed Polycyclic Aromatic Compound)

A sheet-shaped cross-linked rubber was prepared in the same manner as in the resistance to swelling in oil test. In addition to this cross-linked rubber, a phenanthrene-containing test fuel oil was prepared by dissolving phenanthrene in a content of 8 wt % in a mixture of isooctane:ethanol=74:26 (volume ratio). Next, in the phenanthrene-containing test fuel oil prepared as described above, the sheet-shaped cross-linked rubber obtained as described above was immersed at 60° C. for 70 hours; then the cross-linked rubber was taken out from the phenanthrene-containing test fuel oil, dried at 120° C. for 3 hours, allowed to stand still at room temperature for 24 hours, and then the cold resistance of the cross-linked rubber was measured in accordance with JIS K6261 by the TR test (low temperature elasticity recovery test). Specifically, an extended test piece was frozen, then the recoverability of the extended test piece was measured by continuously increasing the temperature, and the temperature TR10 at which the length of the test piece was contracted (recovered) by 10% due to the temperature increase was measured. It is possible to evaluate that the lower TR10, the more excellent in the cold resistance and the resistance to hardening in oil of the cross-linked rubber. The cross-linked rubber having a value of the temperature TR10 of lower than −25° C. was evaluated as "Good", and the cross-linked rubber having a value of the temperature TR10 of −25° C. or higher was evaluated as "Poor".

Synthesis Example 1 (Production of Nitrile Group-Containing Highly Saturated Copolymer Rubber (A1))

In a metallic bottle, 180 parts of ion exchanged water, 25 parts of an aqueous solution of sodium dodecylbenzenesulfonate having a concentration of 10 wt %, 15 parts of acrylonitrile, 6 parts of mono-n-butyl maleate, 39 parts of n-butyl acrylate, and 0.5 part of t-dodecyl mercaptan (molecular weight adjuster) were added in the mentioned order, the gas inside the metallic bottle was replaced with nitrogen three times, and then 40 parts of 1,3-butadiene was placed in the metallic bottle. The metallic bottle was held at 5° C., 0.1 part of cumene hydroperoxide (polymerization initiator) was placed in the metallic bottle, and the polymerization reaction was performed for 16 hours while the metallic bottle was being rotated. After 0.1 part of an aqueous solution of hydroquinone (polymerization terminator) having a concentration of 10 wt % was added to terminate the polymerization reaction, the residual monomers were removed by using a rotary evaporator at a water temperature of 60° C., to obtain a latex (solid content concentration of about 30 wt %) of a copolymer rubber.

Then, in an autoclave, the latex of the copolymer rubber and a palladium catalyst (a solution prepared by mixing 1 wt % palladium acetate acetone solution and an equal weight of ion exchanged water) were added in such a way that the content of palladium was 1,000 ppm by weight in relation to the dry weight of the copolymer rubber contained in the latex of the copolymer rubber, the latex obtained as described above; then, a hydrogenation reaction was performed at a hydrogen pressure of 3.0 MPa and a temperature of 50° C. for 6 hours to obtain a latex of a nitrile group-containing highly saturated copolymer rubber (A1).

Next, to the obtained latex, two times volume of methanol was added to coagulate the latex, and then the resulting mixture was vacuum dried at 60° C. for 12 hours to thereby obtain the nitrile group-containing highly saturated copolymer rubber (A1). With respect to the compositions of the respective monomer units, the obtained nitrile group-containing highly saturated copolymer rubber (A1) included 15 wt % of the acrylonitrile unit, 5 wt % of the mono-n-butyl maleate unit, 35 wt % of the n-butyl acrylate unit, and 45 wt % of the 1,3-butadiene unit (including the hydrogenated fraction), and further, the obtained nitrile group-containing highly saturated copolymer rubber (A1) had an iodine value of 10, a carboxyl group content of $2.8\times10^{-2}$ ephr, and a polymer Mooney viscosity [$ML_{1+4}$, 100° C.] of 40.

Synthesis Example 2 (Production of Nitrile Group-Containing Highly Saturated Copolymer Rubber (A2))

A nitrile group-containing highly saturated copolymer rubber (A2) was obtained in the same manner as in Synthesis Example 1 except that the amount of acrylonitrile used was altered to 21 parts, the amount of mono-n-butyl maleate used was altered to 6 parts, the amount of n-butyl acrylate used was altered to 34 parts, and the amount of 1,3-butadiene used was altered to 39 parts. With respect to the compositions of the respective monomer units, the obtained nitrile group-containing highly saturated copolymer rubber (A2) included 21 wt % of the acrylonitrile unit, 5 wt % of the mono-n-butyl maleate unit, 29 wt % of the n-butyl acrylate unit, and 45 wt % of the 1,3-butadiene unit (including the hydrogenated fraction), and further, the obtained nitrile group-containing highly saturated copolymer rubber (A2) had an iodine value of 10, a carboxyl group content of $2.8\times10^{-2}$ ephr, and a polymer Mooney viscosity [$ML_{1+4}$, 100° C.] of 47.

Synthesis Example 3 (Production of Nitrile Group-Containing Highly Saturated Copolymer Rubber (A3))

A nitrile group-containing highly saturated copolymer rubber (A3) was obtained in the same manner as in Synthesis Example 1 except that 30 parts of 2-methoxyethyl acrylate was used in place of 39 parts of n-butyl acrylate, and the amount of acrylonitrile used was altered to 24 parts, the amount of mono-n-butyl maleate used was altered to 7 parts, and the amount of 1,3-butadiene used was altered to 39 parts. With respect to the compositions of the respective monomer units, the obtained nitrile group-containing highly saturated copolymer rubber (A3) included 24 wt % of the acrylonitrile unit, 6 wt % of the mono-n-butyl maleate unit, 25 wt % of the 2-methoxyethyl acrylate unit, and 45 wt % of the 1,3-butadiene unit (including the hydrogenated fraction), and further, the obtained nitrile group-containing highly saturated copolymer rubber (A3) had an iodine value of 10, a carboxyl group content of $3.2\times10^{-2}$ ephr, and a polymer Mooney viscosity [$ML_{1+4}$, 100° C.] of 48.

Synthesis Example 4 (Production of Nitrile Group-Containing Highly Saturated Copolymer Rubber (A4))

A nitrile group-containing highly saturated copolymer rubber (A4) was obtained in the same manner as in Synthesis Example 1 except that the amount of acrylonitrile used was altered to 16.5 parts, the amount of mono-n-butyl maleate used was altered to 6 parts, the amount of n-butyl acrylate used was altered to 37.8 parts, and the amount of 1,3-butadiene used was altered to 39.8 parts. With respect to the compositions of the respective monomer units, the obtained nitrile group-containing highly saturated copolymer rubber (A4) included 16.5 wt % of the acrylonitrile unit, 5 wt % of the mono-n-butyl maleate unit, 33.5 wt % of the n-butyl acrylate unit, and 45 wt % of the 1,3-butadiene unit (including the hydrogenated fraction), and further, the obtained nitrile group-containing highly saturated copolymer rubber (A4) had an iodine value of 10, a carboxyl group content of $2.8\times10^{-2}$ ephr, and a polymer Mooney viscosity [$ML_{1+4}$, 100° C.] of 45.

Synthesis Example 5 (Production of Nitrile Group-Containing Highly Saturated Copolymer Rubber (A5))

A nitrile group-containing highly saturated copolymer rubber (A5) was obtained in the same manner as in Synthesis Example 1 except that the amount of acrylonitrile used was altered to 18.0 parts, the amount of mono-n-butyl maleate used was altered to 6 parts, the amount of n-butyl acrylate used was altered to 36.5 parts, and the amount of 1,3-butadiene used was altered to 39.5 parts. With respect to the compositions of the respective monomer units, the obtained nitrile group-containing highly saturated copolymer rubber (A5) included 18 wt % of the acrylonitrile unit, 5 wt % of the mono-n-butyl maleate unit, 32 wt % of the n-butyl acrylate unit, and 45 wt % of the 1,3-butadiene unit (including the hydrogenated fraction), and further, the obtained nitrile group-containing highly saturated copolymer rubber (A5) had an iodine value of 10, a carboxyl group content of $2.8\times10^{-2}$ ephr, and a polymer Mooney viscosity [$ML_{1+4}$, 100° C.] of 43.

Synthesis Example 6 (Production of Nitrile Group-Containing Highly Saturated Copolymer Rubber (A6))

A nitrile group-containing highly saturated copolymer rubber (A6) was obtained in the same manner as in Synthesis Example 1 except that the amount of acrylonitrile used was altered to 19.5 parts, the amount of mono-n-butyl maleate used was altered to 6 parts, the amount of n-butyl acrylate used was altered to 35.3 parts, and the amount of 1,3-butadiene used was altered to 39.3 parts. With respect to the compositions of the respective monomer units, the obtained nitrile group-containing highly saturated copolymer rubber (A6) included 19.5 wt % of the acrylonitrile unit, 5 wt % of the mono-n-butyl maleate unit, 30.5 wt % of the n-butyl acrylate unit, and 45 wt % of the 1,3-butadiene unit (including the hydrogenated fraction), and further, the obtained nitrile group-containing highly saturated copolymer rubber (A6) had an iodine value of 10, a carboxyl group content of $2.8\times10^{-2}$ ephr, and a polymer Mooney viscosity [$ML_{1+4}$, 100° C.] of 42.

Synthesis Example 7 (Production of Nitrile Group-Containing Highly Saturated Copolymer Rubber (A7))

The copolymer latex was obtained by performing the polymerization operation in the same manner with the same monomer compositions as in Synthesis Example 4. Then, the hydrogenation reaction was performed for the obtained copolymer latex in the same manner as in Synthesis Example 1 except that the content of palladium was altered to be 900 ppm by weight in relation to the dry weight of the copolymer rubber, and next, coagulation and drying were performed to obtain a nitrile group-containing highly saturated copolymer rubber (A7). With respect to the compositions of the respective monomer units, the obtained nitrile group-containing highly saturated copolymer rubber (A7) included 16.5 wt % of the acrylonitrile unit, 5 wt % of the mono-n-butyl maleate unit, 33.5 wt % of the n-butyl acrylate unit, and 45 wt % of the 1,3-butadiene unit (including the hydrogenated fraction), and further, the obtained nitrile group-containing highly saturated copolymer rubber (A7) had an iodine value of 25, a carboxyl group content of $2.8 \times 10^{-2}$ ephr, and a polymer Mooney viscosity [$ML_{1+4}$, 100° C.] of 43.

Synthesis Example 8 (Production of Nitrile Group-Containing Highly Saturated Copolymer Rubber (A8))

The copolymer latex was obtained by performing the polymerization operation in the same manner with the same monomer compositions as in Synthesis Example 4. Then, the hydrogenation reaction was performed for the obtained copolymer latex in the same manner as in Synthesis Example 1 except that the content of palladium was altered to be 800 ppm by weight in relation to the dry weight of the copolymer rubber, and next, coagulation and drying were performed to obtain a nitrile group-containing highly saturated copolymer rubber (A8). With respect to the compositions of the respective monomer units, the obtained nitrile group-containing highly saturated copolymer rubber (A8) included 16.5 wt % of the acrylonitrile unit, 5 wt % of the mono-n-butyl maleate unit, 33.5 wt % of the n-butyl acrylate unit, and 45 wt % of the 1,3-butadiene unit (including the hydrogenated fraction), and further, the obtained nitrile group-containing highly saturated copolymer rubber (A8) had an iodine value of 45, a carboxyl group content of $2.8 \times 10^{-2}$ ephr, and a polymer Mooney viscosity [$ML_{1+4}$, 100° C.] of 42.

Synthesis Example 9 (Production of Nitrile Group-Containing Highly Saturated Copolymer Rubber (A9))

The copolymer latex was obtained by performing the polymerization operation in the same manner with the same monomer compositions as in Synthesis Example 4. Then, the hydrogenation reaction was performed for the obtained copolymer latex in the same manner as in Synthesis Example 1 except that the content of palladium was altered to be 650 ppm by weight in relation to the dry weight of the copolymer rubber, and next, coagulation and drying were performed to obtain a nitrile group-containing highly saturated copolymer rubber (A9). With respect to the compositions of the respective monomer units, the obtained nitrile group-containing highly saturated copolymer rubber (A9) included 16.5 wt % of the acrylonitrile unit, 5 wt % of the mono-n-butyl maleate unit, 33.5 wt % of the n-butyl acrylate unit, and 45 wt % of the 1,3-butadiene unit (including the hydrogenated fraction), and further, the obtained nitrile group-containing highly saturated copolymer rubber (A9) had an iodine value of 75, a carboxyl group content of $2.8 \times 10^{-2}$ ephr, and a polymer Mooney viscosity [$ML_{1+4}$, 100° C.] of 41.

Example 1

The following ingredients were added to and kneaded with 100 parts of the nitrile group-containing highly saturated copolymer rubber (A1) obtained in Synthesis Example 1 to obtain a cross-linkable nitrile rubber composition: 70 parts of silica (trade name "Nipsil ER," made by Tosoh Silica Corporation), 20 parts of a polyether ester-based plasticizer (trade name "Adekacizer RS-700," made by ADEKA Corporation, plasticizer), 1 part of stearic acid (cross-linking accelerator), 1.5 parts of 4,4'-di-(α,α'-dimethylbenzyl)diphenylamine (trade name "NAUGARD 445," made by Crompton Corporation, antiaging agent), a polyoxyethylene alkyl ether phosphoric acid ester (trade name "Phosphanol RL210," made by Toho Chemical Industry Co., Ltd.,), 4 parts of 1,8-diazabicyclo[5,4,0]-undecene-7 (DBU) (tradename "RHENOGRAN XLA-60 (GE2014)," made by Rhein Chemie Corporation, product composed of 60% of DBU (including a fraction being zinc dialkyldiphosphate salt), basic cross-linking accelerator), and 2 parts of hexamethylene diamine carbamate (trade name "Diak#1," made by DuPont Dow Elastomers L.L.C., polyamine-based cross-linking agent).

Then, by using the obtained cross-linkable nitrile rubber composition, the tests and evaluations of the original state physical properties (hardness, tensile strength, elongation), the cold resistance test, the O-ring compression set, the resistance to swelling in oil test, the hardening test after immersion in the condensed polycyclic aromatic compound-containing fuel oil, and the low-temperature property test after immersion in the condensed polycyclic aromatic compound-containing fuel oil were performed. The results thus obtained are shown in Table 1.

Examples 2 to 20

Cross-linkable nitrile rubber compositions were obtained in the same manner as in Example 1 except that respective components shown in Table 1 were compounded in the amounts shown in Table 1, and the obtained cross-linkable nitrile rubber compositions were evaluated in the same manner as in Example 1. The results thus obtained are shown in Table 1.

For example, in Example 2, as the nitrile group-containing highly saturated copolymer rubber (A), a nitrile group-containing highly saturated copolymer rubber composed of the nitrile group-containing highly saturated copolymer rubber (A1) obtained in Synthesis Example 1 in a content of 25 wt % and the nitrile group-containing highly saturated copolymer rubber (A2) obtained in Synthesis Example 2 in a content of 75 wt % was used, and the respective components shown in Table 1 were used in the amounts shown in Table 1 in relation to 100 parts of the total of the nitrile group-containing highly saturated copolymer rubbers to obtain the cross-linkable nitrile rubber composition.

Note that, in Examples 2 to 20, as the nitrile group-containing highly saturated copolymer rubber (A), two types of the nitrile group-containing highly saturated copolymer rubber (A1) obtained in Synthesis Example 1, the nitrile group-containing highly saturated copolymer rubber (A2) obtained in Synthesis Example 2, and the nitrile group-containing highly saturated copolymer rubber (A3) obtained in Synthesis Example 3 were combined, and the amount of the acrylonitrile unit and the iodine value of each nitrile group-containing highly saturated copolymer rubbers used in Examples 2 to 20 as the nitrile group-containing highly saturated copolymer rubber (A) as a whole were as shown in Table 1 (the same shall apply to Example 21, Comparative Example 2, and Comparative Examples 4 to 11, which will be described later). Note that, in these cases, two types of rubbers were kneaded in advance, and then various compounding agents were added.

Examples 21 to 27

Cross-linkable nitrile rubber compositions were obtained in the same manner as in Example 1 except that respective components shown in Table 2 were compounded in the amounts shown in Table 2, and the obtained cross-linkable nitrile rubber compositions were evaluated in the same manner as in Example 1. The results thus obtained are shown in Table 2.

Comparative Examples 1 to 11

Cross-linkable nitrile rubber compositions were obtained in the same manner as in Example 1 except that respective components shown in Table 2 were compounded in the amounts shown in Table 2, and the obtained cross-linkable nitrile rubber compositions were evaluated in the same manner as in Example 1. The results thus obtained are shown in Table 2.

TABLE 1

| | | Examples | | | | | | | | | | | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| Composition of nitrile group-containing highly saturated copolymer rubber | | | | | | | | | | | | | | | | | | | | | |
| Nitrile group-containing highly saturated copolymer rubber (A1) | (wt %) | 100 | 75 | 50 | 25 | | 75 | 50 | 25 | 25 | 25 | 25 | 25 | 25 | 25 | 25 | 25 | 25 | 25 | 25 | 25 |
| Nitrile group-containing highly saturated copolymer rubber (A2) | (wt %) | | 25 | 50 | 75 | | 25 | | 75 | 75 | 75 | 75 | 75 | 75 | 75 | 75 | 75 | 75 | 75 | 75 | 75 |
| Nitrile group-containing highly saturated copolymer rubber (A3) | (wt %) | | | | | | | 50 | | | | | | | | | | | | | |
| Nitrile group-containing highly saturated copolymer rubber (A4) | (wt %) | | | | | | | | | | | | | | | | | | | | |
| Nitrile group-containing highly saturated copolymer rubber (A5) | (wt %) | | | | | | | | | | | | | | | | | | | | |
| Nitrile group-containing highly saturated copolymer rubber (A6) | (wt %) | | | | | | | | | | | | | | | | | | | | |
| Nitrile group-containing highly saturated copolymer rubber (A7) | (wt %) | | | | | | | | | | | | | | | | | | | | |
| Nitrile group-containing highly saturated copolymer rubber (A8) | (wt %) | | | | | | | | | | | | | | | | | | | | |
| Nitrile group-containing highly saturated copolymer rubber (A9) | (wt %) | | | | | | | | | | | | | | | | | | | | |
| Amount of acrylonitrile unit in nitrile group-containing highly saturated copolymer rubber | (wt %) | 15.0 | 16.5 | 18.0 | 19.5 | | 17.3 | 19.5 | 19.5 | 19.5 | 19.5 | 19.5 | 19.5 | 19.5 | 19.5 | 19.5 | 19.5 | 19.5 | 19.5 | 19.5 | 19.5 |
| Iodine value of nitrile group-containing highly saturated copolymer rubber | | 10.0 | 10.0 | 10.0 | 10.0 | | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Composition of cross-linkable nitrile rubber composition | | | | | | | | | | | | | | | | | | | | | |
| Nitrile group-containing highly saturated copolymer rubber | (parts) | 100 | 100 | 100 | 100 | | 100 | 100 | 100 | 100 | 100 | 100 | 100 | 100 | 100 | 100 | 100 | 100 | 100 | 100 | 100 |
| FEF carbon black | (parts) | | | | | | | | | | | | | | | | | | | 70 | |
| MTcarbon black | (parts) | | | | | | | | | | | | | | | | | | 70 | | 70 |
| Silica (Nipsil ER) | (parts) | 70 | 70 | 70 | 70 | | 70 | 70 | 70 | 70 | 70 | 70 | 70 | 70 | 70 | 70 | 70 | 70 | | | |
| Silica (Nipsil E75) | (parts) | | | | | | | | | | | | | | | | | | | | |
| Clay (BURGESS KE) | (parts) | | | | | | | | | | | | | | | | | 10 | | | |
| Trimellitic acid ester (TOTM) | (parts) | | | | | | | | | | | | | 10 | | | 10 | | | | |
| Trimellitic acid ester (C-9N) | (parts) | | | | | | | | | | | | | | 20 | | | | | | 20 |
| Polyether ester-based plasticizer (RS-700) | (parts) | 20 | 20 | 20 | 20 | | 20 | 20 | 20 | 20 | 20 | 20 | | | | 20 | | 10 | 20 | 20 | |
| Polyether ester-based plasticizer (RS-735) | (parts) | | | | | | | | | | | | | 10 | | | 10 | | | | |
| Adipic acid ether ester-based plasticizer (RS-107) | (parts) | | | | | | | | | 2.5 | 3.5 | | | | | | | | | | |
| 3-Aminopropyltriethoxysilane (Z-6011) | (parts) | 1.5 | 1.5 | 1.5 | 1.5 | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | | 1 | 1 | 1 | 1 | 1 | 1 | 1 | 1 | 1 | 1 | 1 | 1 | 1 | 1 | 1 |
| 4,4'-Di(α,α'-dimethylbenzyl)diphenylamine | (parts) | 1 | 1 | 1 | 1 | | 1 | 1 | 1 | 1 | 1 | 1 | 1 | 1 | 1 | 1 | 1 | 1 | 1 | 1 | 1 |
| Polyoxyethylene alkyl ether phosphoric acid ester | (parts) | 4 | 4 | 4 | 4 | | 4 | 4 | 4 | 4 | 4 | 4 | 4 | 4 | 4 | 4 | 4 | 4 | 4 | 4 | 4 |
| 1,8-Diazabicyclo[5,4,0]-undecene-7 60% product | (parts) | 2 | 2 | 2 | 2 | | 2 | 2 | 2 | 2 | 2 | 2 | 2 | 2 | 2 | 2 | 2 | 2 | 2 | 2 | 2 |
| Hexamethylenediamine carbamate | (parts) | | | | | | | | | | | | | | | | | | | | |

TABLE 1-continued

| Evaluation | | Examples | | | | | | | | | | | | | | | | | | | |
|---|---|---|---|---|---|---|---|---|---|---|---|---|---|---|---|---|---|---|---|---|---|
| | | 1 | 2 | 3 | 4 | 6 | 7 | 8 | 9 | 10 | 11 | 12 | 13 | 14 | 15 | 16 | 17 | 18 | 19 | 20 |
| Hardness | pts | 76 | 75 | 74 | 74 | 75 | 76 | 74 | 76 | 76 | 76 | 85 | 81 | 75 | 74 | 75 | 74 | 81 | 66 | 75 |
| Tensile Strength | (MPa) | 13.0 | 13.2 | 12.8 | 13.3 | 12.9 | 12.8 | 12.0 | 13.3 | 13.9 | 16.4 | 16.1 | 14.5 | 12.9 | 12.9 | 13.3 | 13.2 | 14.9 | 12.8 | 12.9 |
| Elongation at break | (%) | 270 | 260 | 250 | 270 | 270 | 260 | 300 | 260 | 230 | 100 | 250 | 270 | 270 | 280 | 260 | 260 | 180 | 240 | 270 |
| TR test (TR10) | (° C.) | −42 | −41 | −39 | −39 | −37 | −36 | −38 | −39 | −39 | −39 | −33 | −36 | −39 | −40 | −38 | −38 | −40 | −39 | −39 |
| O-ring compression set (120° C., 70 hr) | (%) | 18 | 19 | 20 | 18 | 18 | 17 | 21 | 18 | 20 | 14 | 17 | 17 | 18 | 19 | 18 | 19 | 20 | 20 | 18 |
| Resistance to swelling in oil test (Fuel-B:ethanol 74:26 (v/v) 60° C. 70 hr) | (%) | +92 | +86 | +82 | +78 | +80 | +71 | +81 | +77 | +75 | +76 | +87 | +84 | +77 | +79 | +78 | +77 | +77 | +76 | +79 |
| Hardness change when cross-linked rubber is immersed in condensed polycyclic aromatic compound-containing fuel oil | pts evaluation | +5 Good | +6 Good | +8 Good | +8 Good | +8 Good | +9 Good | +9 Good | +8 Good | +8 Good | +9 Good | −5 Good | +4 Good | +8 Good | +9 Good | +9 Good | +8 Good | +8 Good | +9 Good | +8 Good |
| TR test after cross-linked rubber is immersed in condensed polycyclic aromatic compound-containing fuel oil (TR10) | (° C.) evaluation | −29 Good | −28 Good | −26 Good | −26 Good | −27 Good | −26 Good | −26 Good | −26 Good | −26 Good | −28 Good | −26 Good | −26 Good | −26 Good | −27 Good | −26 Good | −26 Good | −28 Good | −27 Good | −26 Good |

TABLE 2

| | | Examples | | | | | | | Comparative Examples | | | | | | | | | | |
|---|---|---|---|---|---|---|---|---|---|---|---|---|---|---|---|---|---|---|---|
| | | 21 | 22 | 23 | 24 | 25 | 26 | 27 | 1 | 2 | 3 | 4 | 5 | 6 | 7 | 8 | 9 | 10 | 11 |
| Composition of nitrile group-containing highly saturated copolymer rubber | | | | | | | | | | | | | | | | | | | |
| Nitrile group-containing highly saturated copolymer rubber (A1) | (wt %) | 25 | | | | | | | | 25 | | | | | | | | | 25 |
| Nitrile group-containing highly saturated copolymer rubber (A2) | (wt %) | 75 | | | | | | | | 75 | | | | | | | | | 75 |
| Nitrile group-containing highly saturated copolymer rubber (A3) | (wt %) | | 100 | | | | | | | | | | | | | | | | |
| Nitrile group-containing highly saturated copolymer rubber (A4) | (wt %) | | | 100 | | | | | | | | | | | | | | | |
| Nitrile group-containing highly saturated copolymer rubber (A5) | (wt %) | | | | 100 | | | | | | | | | | | | | | |
| Nitrile group-containing highly saturated copolymer rubber (A6) | (wt %) | | | | | 100 | | | | | | | | | | | | | |
| Nitrile group-containing highly saturated copolymer rubber (A7) | (wt %) | | | | | | 100 | | | | | | | | | | | | |
| Nitrile group-containing highly saturated copolymer rubber (A8) | (wt %) | | | | | | | 100 | | | | | | | | | | | |
| Nitrile group-containing highly saturated copolymer rubber (A9) | (wt %) | | | | | | | | 100 | | | | | | | | | | |
| Amount of acrylonitrile unit in nitrile group-containing highly saturated copolymer rubber | (wt %) | 19.5 | 16.5 | 18 | 19.5 | 16.5 | 16.5 | 16.5 | 21.0 | 21.8 | 24.0 | 19.5 | 19.5 | 19.5 | 19.5 | 19.5 | 19.5 | 19.5 | 19.5 |
| Iodine value of nitrile group-containing highly saturated copolymer rubber | | 10.0 | 10.0 | 10.0 | 10.0 | 25.0 | 45.0 | 75.0 | 10.0 | 10.0 | 10.0 | 10.0 | 10.0 | 10.0 | 10.0 | 10.0 | 10.0 | 10.0 | 10.0 |
| Composition of cross-linkable nitrile rubber composition | | | | | | | | | | | | | | | | | | | |
| Nitrile group-containing highly saturated copolymer rubber | (parts) | 100 | 100 | 100 | 100 | 100 | 100 | 100 | 100 | 100 | 100 | 100 | 100 | 100 | 100 | 100 | 100 | 100 | 100 |
| FEF carbon black | (parts) | 35 | | | | | | | | | | | | | | | | 70 | |
| MT carbon black | (parts) | 35 | 70 | 70 | 70 | 70 | 70 | 70 | 70 | 70 | 70 | 70 | 70 | 70 | 40 | 100 | | 70 | 70 |
| Silica (Nipsil ER) | (parts) | | | | | | | | | | | | | | | | | | |
| Silica (Nipsil E75) | (parts) | | | | | | | | | | | | | | | | | | |
| Clay (BURGESS KE) | (parts) | | | | | | | | | | | | | 20 | | | | | |
| Trimellitic acid ester (TOTM) | (parts) | | | | | | | | | | | 30 | | | | | | | |
| Trimellitic acid ester (C-9N) | (parts) | | | | | | | | | | | | | | | | 140 | | |
| Polyether ester-based plasticizer (RS-700) | (parts) | 20 | 20 | 20 | 20 | 20 | 20 | 20 | 20 | 20 | | | | | 20 | 20 | | 20 | 20 |
| Polyether ester-based plasticizer (RS-735) | (parts) | | | | | | | | | | | | | | | | | | |
| Adipic acid ether ester-based plasticizer (RS-107) | (parts) | | | | | | | | | | | | | | | | | | |
| 3-Aminopropyltriethoxysilane (Z-6011) | (parts) | | | | | | | | | | | | | | | | | | |
| Stearic acid | (parts) | 1 | 1 | 1 | 1 | 1 | 1 | 1 | 1 | 1 | 1 | 1 | 1 | 1 | 1 | 1 | 1 | 1 | 1 |
| 4,4'-Di(α,α'-dimethylbenzyl)diphenylamine | (parts) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Polyoxyethylene alkyl ether phosphoric acid ester | (parts) | 1 | 1 | 1 | 1 | 1 | 1 | 1 | 1 | 1 | 1 | 1 | 1 | 1 | 1 | 1 | 1 | 1 | 1 |
| 1,8-Diazabicyclo[5,4,0]-undecene-7 60% product | (parts) | 4 | 4 | 4 | 4 | 4 | 4 | 4 | 4 | 4 | 4 | 4 | 4 | 4 | 4 | 4 | 4 | 4 | 4 |
| Hexamethylenediamine carbamate | (parts) | 2 | 2 | 2 | 2 | 2 | 2 | 2 | 2 | 2 | 2 | 2 | 2 | 2 | 2 | 2 | 2 | 2 | 2 |
| Evaluation | | | | | | | | | | | | | | | | | | | |
| Hardness | pts | 78 | 76 | 75 | 75 | 75 | 75 | 75 | 74 | 75 | 76 | 71 | 76 | 75 | 64 | 86 | 76 | 94 | 86 |
| Tensile Strength | (MPa) | 13.8 | 13.4 | 12.9 | 13.5 | 13.2 | 13.1 | 13.5 | 13.5 | 13.0 | 12.9 | 11.8 | 13.2 | 13.1 | 14.2 | 12.4 | 7.5 | 11.6 | 9.4 |
| Elongation at break | (%) | 220 | 270 | 260 | 280 | 270 | 280 | 270 | 280 | 270 | 260 | 260 | 270 | 260 | 280 | 250 | 320 | 160 | 260 |
| TR test (TR10) | (° C.) | −39 | −41 | −40 | −40 | −41 | −41 | −42 | −38 | −35 | −35 | −41 | −37 | −36 | −39 | −38 | −38 | −39 | −38 |
| O-ring compression set (120° C., 70 hr) | (%) | 18 | 19 | 20 | 19 | 19 | 21 | 24 | 18 | 17 | 16 | 19 | 17 | 18 | 18 | 19 | 21 | 20 | 21 |
| Resistance to swelling in oil test (Fuel-B:ethanol = 74:26 (v/v) 60° C. 70 hr) | (%) | +76 | +85 | +81 | +78 | +85 | +84 | +82 | +73 | +61 | +50 | +73 | +79 | +78 | +85 | +72 | +68 | +66 | +65 |
| Hardness change when cross-linked rubber is immersed in condensed polycyclic aromatic compound-containing fuel oil | pts | +9 | +6 | +8 | +8 | +6 | +7 | +8 | +9 | +11 | +13 | +13 | +9 | +9 | +10 | +7 | +10 | +7 | +8 |
| | evaluation | Good | Good | Good | Good | Good | Good | Good | Good | Good | Poor | Poor | Good | Good | Poor | Good | Poor | Good | Good |
| TR test after cross-linked rubber is immersed in condensed polycyclic aromatic compound-containing fuel oil (TR10) | (° C.) | −26 | −28 | −27 | −26 | −28 | −28 | −29 | −25 | −23 | −19 | −25 | −24 | −23 | −25 | −25 | −25 | −25 | −25 |
| | evaluation | Good | Good | Good | Good | Good | Good | Good | Poor | Poor | Poor | Poor | Poor | Poor | Poor | Poor | Poor | Poor | Poor |

Respective components in Table 1 and Table 2 are as follows.

"FEF carbon black": FEF carbon black (trade name "Seast SO," made by Tokai Carbon Co., Ltd.)

"MT carbon black": MT carbon black (trade name "Thermax® medium thermal carbon black N990," made by CANCARB)

"Silica (Nipsil ER)": silica (trade name "Nipsil ER," made by Tosoh Silica Corporation)

"Silica (Nipsil E75)": silica (trade name "Nipsil E75," made by Tosoh Silica Corporation)

"Clay (BURGESS KE)": clay (trade name "BURGESS KE," made by Burgess Pigment Company, silane-treated clay)

"Trimellitic acid ester (TOTM)": tri-2-ethylhexyl trimellitate (trade name "Adekacizer C-8," made by ADEKA Corporation, plasticizer)

"Trimellitic acid ester (C-9N)": trimellitic acid isononyl ester (trade name "Adekacizer C-9N," made by ADEKA Corporation, plasticizer)

"Polyether ester-based plasticizer (RS-700)": polyether ester-based plasticizer (trade name "Adekacizer RS-700," made by ADEKA Corporation, plasticizer)

"Polyether ester-based plasticizer (RS-735)": polyether ester-based plasticizer (trade name "Adekacizer RS-735," made by ADEKA Corporation, plasticizer)

"Adipic acid ether ester-based plasticizer (RS-107)": adipic acid ether ester-based plasticizer (trade name "Adekacizer RS-107," made by ADEKA Corporation, plasticizer)

"3-Aminopropyltriethoxysilane (Z-6011)": 3-aminopropyltriethoxysilane (trade name "Z-6011," made by Dow Corning Toray Co. Ltd., silane coupling agent)

"Stearic acid": stearic acid (cross-linking accelerator)

"4,4'-Di-(β,α'-dimethylbenzyl)diphenylamine": 4,4'-di-(α,α'-dimethylbenzyl)diphenylamine (trade name "NAUGARD 445," made by Crompton Corporation, antiaging agent)

"Polyoxyethylene alkyl ether phosphoric acid ester": polyoxyethylene alkyl ether phosphoric acid ester (trade name "Phosphanol RL210," made by Toho Chemical Industry Co., Ltd.)

"1,8-Diazabicyclo[5,4,0]-undecene-7 60% product": 1,8-diazabicyclo[5,4,0]-undecene-7 (DBU) (trade name "RHENOGRAN XLA-60 (GE2014)," made by Rhein Chemie Corporation, product composed of 60% of DBU (including a fraction being zinc dialkyldiphosphate salt), basic cross-linking accelerator)

"Hexamethylene diamine carbamate": hexamethylene diamine carbamate (trade name "Diak#1," made by Du Pont Dow Elastomer, polyamine-based cross-linking agent)

As shown in Table 1 and Table 2, the cross-linked rubbers obtained by using the nitrile rubber compositions obtained by mixing the filler (B) in an amount of 50 to 90 parts by weight and the adipic acid ester-based plasticizer and/or the ether ester-based plasticizer (C) in an amount of 0 to 29.9 parts by weight in relation to 100 parts by weight of the nitrile group-containing highly saturated copolymer rubbers (A) comprising the α,β-ethylenically unsaturated nitrile monomer unit in a content of 14 wt % or more and less than 21 wt %, and having an iodine value of 120 or less were excellent in the cold resistance, the compression set resistance, the resistance to swelling in oil, and the resistance to hardening in oil (specifically, hardness change when the cross-linked rubbers were immersed in the fuel oil containing a condensed polycyclic aromatic compound, cold resistance after the cross-linked rubbers were immersed in the fuel oil containing a condensed polycyclic aromatic compound) (Examples 1 to 27).

On the other hand, when the nitrile group-containing highly saturated copolymer rubbers in which the content of the α,β-ethylenically unsaturated nitrile monomer unit is too large were used (Comparative Examples 1 to 3), when the amount of the adipic acid ester-based plasticizer and/or the ether ester-based plasticizer (C) used was large (Comparative Example 4), when the plasticizer other than the adipic acid ester-based plasticizer and/or the ether ester-based plasticizer (C) was used (Comparative Examples 5 and 6), when the content of the filler (B) was too small (Comparative Example 7), or when the content of the filler (B) was too large (Comparative Examples 8 to 11), the obtained cross-linked rubbers were found to be inferior in any one of or both the hardness change when the cross-linked rubbers were immersed in the fuel oil containing a condensed polycyclic aromatic compound and the cold resistance after the cross-linked rubbers were immersed in the fuel oil containing a condensed polycyclic aromatic compound.

The invention claimed is:

1. A nitrile rubber composition comprising a filler (B) in a content of 50 to 90 parts by weight and at least one of an adipic acid ester-based plasticizer and an ether ester-based plasticizer (C) in a content of 0 to 29.9 parts by weight in relation to 100 parts by weight of a nitrile group-containing highly saturated copolymer rubber (A) comprising an α,β-ethylenically unsaturated nitrile monomer unit in a proportion of 14 wt % or more and less than 21 wt %, and having an iodine value of 120 or less,
    wherein the rubber (A) comprises two or more nitrile group-containing highly saturated copolymer rubbers each having at least one of a different monomer composition and a different iodine value, and
    a mixture obtained by mixing the two or more nitrile group-containing highly saturated copolymer rubbers each having the at least one of the different monomer composition and the different iodine value is used as the nitrile group-containing highly saturated copolymer rubber (A).

2. The nitrile rubber composition according to claim 1, wherein the nitrile group-containing highly saturated copolymer rubber (A) further comprises an α,β-ethylenically unsaturated monocarboxylic acid ester monomer unit.

3. The nitrile rubber composition according to claim 2, wherein the α,β-ethylenically unsaturated monocarboxylic acid ester monomer unit is an n-butyl acrylate unit or a methoxyethyl acrylate unit.

4. The nitrile rubber composition according to claim 2, wherein the nitrile group-containing highly saturated copolymer rubber (A) comprises the α,β-ethylenically unsaturated nitrile monomer unit in a content of 14 wt % or more and less than 21 wt %, a conjugated diene monomer unit in a content of 20 to 70.9 wt %, a carboxyl group-containing monomer unit in a content of 0.1 to 20 wt %, and the α,β-ethylenically unsaturated monocarboxylic ester monomer unit in a content of 10 to 60 wt %.

5. A cross-linkable nitrile rubber composition obtained by mixing a cross-linkable agent with the nitrile rubber composition according to claim 1.

6. The cross-linkable nitrile rubber composition according to claim 5, wherein the cross-linkable agent is a polyamine-based cross-linkable agent.

7. A cross-linked rubber obtained by the cross-linkable nitrile rubber composition according to claim 5.

8. An intake manifold gasket obtained by using the cross-linked rubber according to claim 7.

* * * * *